United States Patent [19]

Maslow

[11] Patent Number: 4,458,373
[45] Date of Patent: Jul. 10, 1984

[54] LACED SHOE AND METHOD FOR TIEING SHOELACES

[76] Inventor: Andrew D. Maslow, 35 W. 82nd St., New York, N.Y. 10024

[21] Appl. No.: 404,592

[22] Filed: Aug. 2, 1982

[51] Int. Cl.³ .................... A43C 11/12; A43B 11/00
[52] U.S. Cl. .................. 12/142 LC; 36/50; 36/138
[58] Field of Search .......... 36/50, 132, 136, 138; 12/142 LC

[56] References Cited

U.S. PATENT DOCUMENTS 3,108,385 10/1963 Teufel ................................. 36/50

FOREIGN PATENT DOCUMENTS 244030  8/1946 Switzerland ............................ 36/50
285465  9/1952 Switzerland ............................ 36/50
2021383 12/1979 United Kingdom .................. 36/132

*Primary Examiner*—Werner H. Schroeder
*Assistant Examiner*—Steven N. Meyers
*Attorney, Agent, or Firm*—Andrew D. Maslow

[57] ABSTRACT

A lace is secured in a shoe through a mechanical securing device comprising: A piston-type device having an opening which closes upon the lace and thereby secures the lace and close the footwear.

2 Claims, 3 Drawing Figures

LACED SHOE AND METHOD FOR TIEING SHOELACES

FIELD OF INVENTION

This invention relates to an improved method for tieing shoelaces and an improved lace-tied shoe.

BACKGROUND OF THE INVENTION

For many years, lace-tied shoes have been in use wherein the upper of the shoe is secured on the foot through laces which have to be tied and untied in order to secure and remove the shoe from the foot. The most common method for tieing such shoes is to use an overhand knot followed by a bow. Frequently if the bow is not tied in a further overhand knot, in what is sometimes referred to as a knotted bow, the shoelace becomes untied during normal use of the shoe.

Persons engaged in sports using laced shoes or sneakers, such as running, tennis, football and basketball, normally use laced type shoes and sneakers. A common problem in such sports is having the lace become untied unintentionally during the sports activity. The most common way to avoid such problem is to tie the shoes in what is commonly known as a "double knot" wherein the bow is further tied into an overhand knot. A big disadvantage in the double knot is that when the user of the shoe wants to take the shoe off, it is often difficult to untie the knot.

A particular problem is found with the ordinary jogger who runs many miles frequently over varied terrain and quite often picks up mud and moisture on the soles of the shoe. The usual jogger returns to his home and being quite tired must bend over and untie the double-knotted shoes in order to take them off prior to entering his home. Frequently the frustration involved in untieing securely knotted running shoes overcomes the jogger and the jogger merely enters the home with his shoes still packed with mud or water on the soles and frequently bringing said mud or water onto the floors of his home.

SUMMARY OF INVENTION

The shoe and method for tieing the lace shoe provided in the invention overcomes the disadvantage of the ordinary laced sports shoe or sneaker in that the shoe is securely fastened and will not come untied during ordinary sports activity and yet is easily removable without having to untie "secure knots" in the laces of the shoe.

It is further an object of the invention to provide a shoe which is easy to secure to the foot and which does not need excess laces.

In accordance with the invention mechanical means are provided on the laces to secure the laces, said means being referred to herein as a "cord-lock". The laces of the shoe are inserted into or on the cord-lock and the ends of the laces are then secured to the shoe or to another portion of the lace itself.

When the laces are inserted into the mechanical means and the mechanical means is placed in a closed position, the mechanical means is secured to the laces and the laces cannot be readily pulled through said means until it is placed into an open position.

The cord-locks which are used in the instant invention are commonly known but have not heretofore been used in connection with the securing of a shoe on a foot. Cord-locks are frequently used to secure drawstrings on sleeping bags, stuff-sacks and the like.

BRIEF DESCRIPTIONS OF THE DRAWINGS

DETAILED DESCRIPTIONS OF THE DRAWINGS

Figure 1:
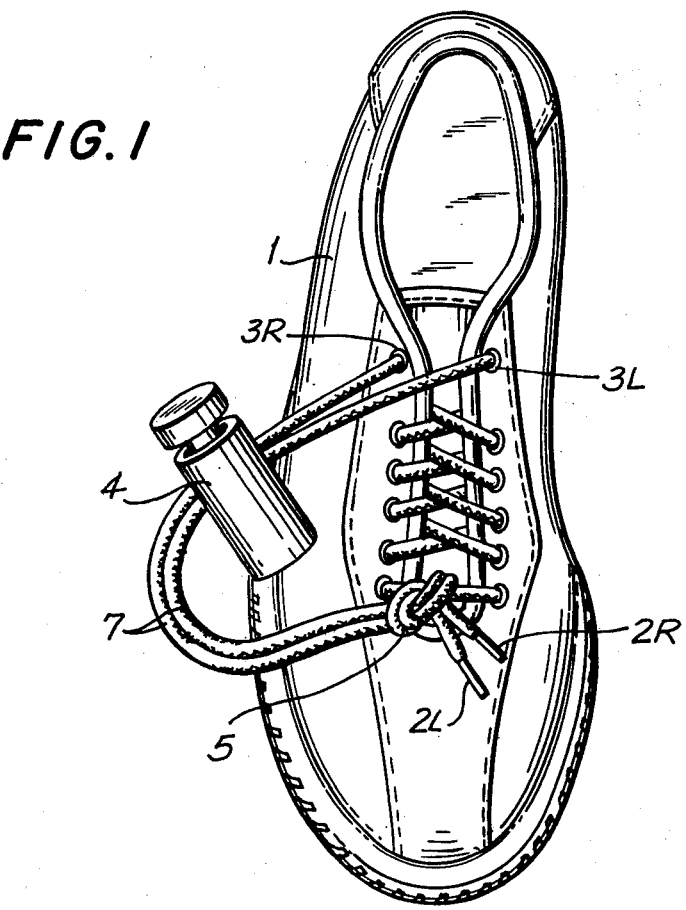
FIG. 1 is a top perspective view of a shoe tied in accordance with the invention and in the "unlaced position."

In FIG. 1 a laced shoe is shown having an upper (1) into which a lace (2) is inserted into lace-holes (3). Lace (2) is inserted through the lace-holes so that the two ends of the lace extend through holes 3L and 3R. The ends of the laces, 2L and 2R, are inserted through cord-lock (4) and are then secured with an overhand knot (5) to that portion of the lace closest to the front of the shoe. It is also possible that the ends of the lace may be secured to another portion of the lace shoe such as by securing them through a lace hole on the upper of the shoe.

Figure 2:
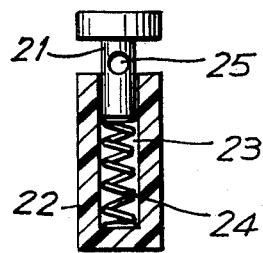
FIG. 2 is a cross-section of a cord-lock.
Figure 3:
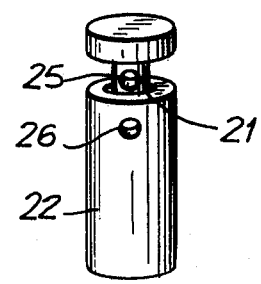
FIG. 3 is a perspective view of a cord-lock used in the preferred embodiment of the invention.

In FIGS. 2 and 3 a cord-lock is shown in which a piston (21) inserted into a cylindrical base (22). The cylinder (23) has at the bottom thereof a spring (24) which is compressed when the piston is pressed down through the cylinder. The piston is provided with an opening (25) which, when the piston is pressed down through the cylinder thereby compressing spring (24), matches the opening (26) in the base. The opening in the base (26) extends through the cylinder so that when the opening in the piston is matched with the opening in the base, a clear opening is provided through the base and the piston. When the openings are matched with the piston in a down position, the ends of the laces (2R and 2L) may both be inserted through openings 26 and 25. The spring (24) being compressed exerts upward pressure on the piston (25) and the lace being extended through holes 25 and 26 prevents the piston from being ejected from the base. The upward pressure provided by spring (24) crimps the lace and provides a secure fastening preventing the lace from slipping through holes 25 and 26 unless a downward pressure is exerted on piston 21.

It should now be clear that when the cord-lock is placed on the shoe and the lace inserted through the cord-lock and secured to the lace itself or the shoe, it is a relatively simple matter to place the shoe on the foot and secure it as well as take the shoe off. To put the shoe on the piston it is pushed down so that holes 25 and 26 are substantially aligned thereby facilitating the movement of the cord-lock towards the front of the shoe. With the cord-lock moved towards the front of the shoe, the laces are in a loose position so that the upper may be separated and the lace may be easily slid through lace holes 3R, 3L and the lace holes beneath them thereby making it easy to put on or to remove the shoe.

In order to secure the shoe the piston is once again pressed so that holes 25 and 26 are substantially aligned and the portion of the lace which is between the cord-lock and the secured ends of the lace (7) is pulled so that the cord-lock moves towards lace holes 3L and 3R. The closer the cord-lock is moved towards lace holes 3L and 3R, the more secure the shoe is made on the foot. Once the cord-lock is placed in a position where the shoe feels comfortable the piston is released and the cord-lock securely fastens the laces so that they will not come untied until the piston is once again pressed in a downward position aligning holes 25 and 26.

In view of the above it will be seen that the several objects of the invention are achieved and other advantageous results attained. As various changes could be made in the above shoe and method for tieing thereof without departing from the scope of the invention, it is intended that all matter contained in the above description or shown in the accompanying drawings shall be interpreted as illustrative and not in a limiting sense.

What is claimed is:

1. A method for securing a lace tied shoe wherein said shoe comprises an upper having at least two openings adapted for the insertion of a lace and a lace, said method comprising:

(a) inserting the ends of said lace through two openings in said upper of the shoe,
   (b) threading said lace through mechanical securing means, said mechanical securing means being capable of inhibiting said lace from sliding through movable on said lace means and,
   (c) securing the ends of said lace to the upper of said shoe or to a portion of said lace which has been inserted through said two openings of said shoe.

2. A method according to claim 1 wherein said mechanical securing means comprises a piston, a base containing a cylinder adapted to accept said piston, a spring in said cylinder, and wherein said base forms an opening extending through said cylinder, and said piston forms a similar sized opening so that when said piston is placed in said cylinder and compresses said spring, the openings formed by the base and that formed by the piston can be substantially aligned.

* * * * *